(12) United States Patent
Eichorn et al.

(10) Patent No.: US 8,780,401 B2
(45) Date of Patent: *Jul. 15, 2014

(54) SYSTEMS AND METHODS FOR ANALYZING DIGITAL SLIDE IMAGES USING ALGORITHMS CONSTRAINED BY PARAMETER DATA

(71) Applicant: Aperio Technologies, Inc., Vista, CA (US)

(72) Inventors: Ole Eichorn, Westlake Village, CA (US); Allen Olson, San Diego, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,105

(22) Filed: Jun. 18, 2013

(65) Prior Publication Data

US 2013/0279807 A1    Oct. 24, 2013

Related U.S. Application Data

(63) Continuation of application No. 13/494,715, filed on Jun. 12, 2012, now Pat. No. 8,467,083, which is a continuation of application No. 12/428,394, filed on Apr. 22, 2009, now Pat. No. 8,199,358, which is a continuation of application No. 11/536,985, filed on Sep. 29, 2006, now Pat. No. 7,602,524, which is a continuation of application No. 10/787,330, filed on Feb. 26, 2004, now Pat. No. 7,116,440.

(60) Provisional application No. 60/451,081, filed on Feb. 28, 2003, provisional application No. 60/461,318, filed on Apr. 7, 2003.

(51) Int. Cl.
*G06K 15/00*    (2006.01)
*G06F 3/12*     (2006.01)

(52) U.S. Cl.
USPC ............................... 358/1.15; 358/1.13

(58) Field of Classification Search
USPC ........... 358/1.1, 1.5, 1.7, 1.9, 1.13, 1.15, 448, 358/537, 538; 382/133, 144, 275; 709/201, 709/213, 214, 215, 217
See application file for complete search history.

(56) References Cited

U.S. PATENT DOCUMENTS 3,643,015 A    2/1972    Davidovits et al.
4,673,988 A    6/1987    Jansson et al.

(Continued)

FOREIGN PATENT DOCUMENTS

CA    2229175       8/1999
CA    2229175 A1    8/1999

(Continued)

OTHER PUBLICATIONS

Hamilton, Eric, JPEG File Interchange Format:, Version 1.02, Sep. 1, 1992; C-Cube Microsystem, Milpitas, CA.

(Continued)

*Primary Examiner* — Gabriel Garcia
(74) *Attorney, Agent, or Firm* — Pattric J. Rawlins; Procopio, Cory, Hargreaves & Savitch LLP

(57) ABSTRACT

Systems and methods for processing the content of a digital image of a microscope sample. In an embodiment, identifications of algorithm(s) and digital slide image(s) may be received over a network. Parameter data may also be received for the identified algorithm(s). The identified digital slide image(s) may then be retrieved and the identified algorithm(s) may be executed to analyze the retrieved digital slide image(s). The execution of the algorithm(s) may be constrained based on the received parameter data.

18 Claims, 3 Drawing Sheets

(56) References Cited

U.S. PATENT DOCUMENTS

| | | |
|---|---|---|
| 4,700,298 A | 10/1987 | Palcic et al. |
| 4,742,558 A | 5/1988 | Ishibashi et al. |
| 4,744,642 A | 5/1988 | Yoshinaga et al. |
| 4,760,385 A | 7/1988 | Jansson et al. |
| 4,777,525 A | 10/1988 | Preston |
| 4,806,015 A | 2/1989 | Cottingham |
| 4,845,552 A | 7/1989 | Jaggi et al. |
| 4,960,999 A | 10/1990 | McKean et al. |
| 4,987,480 A | 1/1991 | Lippman et al. |
| 5,086,477 A | 2/1992 | Yu et al. |
| 5,172,228 A | 12/1992 | Israelsen |
| 5,187,754 A | 2/1993 | Currin et al. |
| 5,231,663 A | 7/1993 | Earl et al. |
| 5,400,145 A | 3/1995 | Suita et al. |
| 5,412,214 A | 5/1995 | Suzuki et al. |
| 5,495,535 A | 2/1996 | Smilansky et al. |
| 5,578,832 A | 11/1996 | Trulson et al. |
| 5,633,948 A | 5/1997 | Kegelmeyer, Jr. |
| 5,644,356 A | 7/1997 | Swinson et al. |
| 5,672,861 A | 9/1997 | Fairley et al. |
| 5,710,835 A | 1/1998 | Bradley |
| 5,714,756 A | 2/1998 | Park et al. |
| 5,790,710 A | 8/1998 | Price et al. |
| 5,793,969 A | 8/1998 | Kamentsky et al. |
| 5,796,861 A | 8/1998 | Vogt et al. |
| 5,834,758 A | 11/1998 | Trulson et al. |
| 5,845,013 A | 12/1998 | Bouchard et al. |
| 5,872,591 A | 2/1999 | Truc et al. |
| 5,912,699 A | 6/1999 | Hayenga et al. |
| 5,922,282 A | 7/1999 | Ledley |
| 5,932,872 A | 8/1999 | Price |
| 5,943,122 A | 8/1999 | Holmes |
| 5,963,314 A | 10/1999 | Worster et al. |
| 5,968,731 A | 10/1999 | Layne et al. |
| 5,991,444 A | 11/1999 | Burt et al. |
| 5,999,662 A | 12/1999 | Burt et al. |
| 6,002,789 A | 12/1999 | Olsztyn et al. |
| 6,005,964 A | 12/1999 | Reid et al. |
| 6,049,421 A | 4/2000 | Raz et al. |
| 6,078,681 A | 6/2000 | Silver |
| 6,091,846 A | 7/2000 | Lin et al. |
| 6,101,265 A | 8/2000 | Bacus et al. |
| 6,215,892 B1 | 4/2001 | Douglass et al. |
| 6,262,838 B1 | 7/2001 | Montagu |
| 6,272,235 B1 | 8/2001 | Bacus et al. |
| 6,288,782 B1 | 9/2001 | Worster et al. |
| 6,289,115 B1 | 9/2001 | Takeo |
| 6,327,377 B1 | 12/2001 | Rutenberg et al. |
| 6,330,348 B1 | 12/2001 | Kerschmann et al. |
| 6,438,268 B1 | 8/2002 | Cockshott et al. |
| 6,519,357 B2 | 2/2003 | Takeuchi |
| 6,594,401 B1 | 7/2003 | Metcalfe et al. |
| 6,707,469 B1 | 3/2004 | Kelly |
| 6,711,283 B1 | 3/2004 | Soenksen |
| 6,714,281 B1 | 3/2004 | Amano et al. |
| 6,763,140 B1 | 7/2004 | Skoll |
| 6,917,696 B2 | 7/2005 | Soenksen |
| 7,035,478 B2 | 4/2006 | Crandall et al. |
| 7,106,895 B1 | 9/2006 | Goldberg et al. |
| 7,116,480 B1 | 10/2006 | Li |
| 7,155,049 B2 | 12/2006 | Wetzel et al. |
| 7,212,667 B1 | 5/2007 | Shin et al |
| 7,247,825 B2 | 7/2007 | Soenksen et al. |
| 7,312,919 B2 | 12/2007 | Overbeck |
| 7,338,168 B2 | 3/2008 | Cartlidge et al. |
| 7,428,324 B2 | 9/2008 | Crandall et al. |
| 7,602,524 B2 | 10/2009 | Eichhorn et al. |
| 2001/0017941 A1 | 8/2001 | Chaddha |
| 2009/0028414 A1 | 1/2009 | Crandall et al. |

FOREIGN PATENT DOCUMENTS

| | | |
|---|---|---|
| DE | 10232242 | 2/2004 |
| DE | 10232242 A1 | 2/2004 |
| EP | 0339582 | 4/1989 |
| EP | 0339582 A2 | 11/1989 |
| EP | 0871052 | 10/1998 |
| EP | 0871052 A1 | 10/1998 |
| JP | 07-105376 | 4/1995 |
| JP | 08-044678 | 2/1996 |
| JP | 08-044678 A | 2/1996 |
| JP | 10-222466 | 8/1998 |
| JP | 11-23965 | 8/1999 |
| JP | 11-239165 | 8/1999 |
| JP | 2001-166911 | 6/2001 |
| JP | 2001166911 A | 6/2001 |
| JP | 2001210263 | 8/2001 |
| JP | 2001210263 A | 8/2001 |
| JP | 2002042706 | 2/2002 |
| JP | 2002042706 A | 2/2002 |
| JP | 2002-251603 | 9/2002 |
| JP | 2002251603 A | 9/2002 |
| JP | 2002-544602 | 12/2002 |
| WO | 91/14342 A1 | 9/1991 |
| WO | WO 91 14342 | 9/1991 |
| WO | 98/39728 A1 | 9/1998 |
| WO | WO 98/39728 | 9/1998 |
| WO | 98/44446 A1 | 10/1998 |
| WO | WO 98/44446 | 10/1998 |
| WO | 01/84209 A2 | 11/2001 |
| WO | WO0184209 | 11/2001 |

OTHER PUBLICATIONS

Adobe Developers Association, "TIFF" revision 6.0, Jun. 3, 1992; Adobe Systems Incorporated, Mountain View, CA.

International Search Report and Written Opinion from PCT/US04/06013 mailed Aug. 4, 2008.

Hamilton, Eric, JPEG File Interchange Format, Version 1.02, Sep. 1, 1992, C-Cube Microsystem, Milpitas, CA.

Adobe Developers Association, "TIFF" revision 6.0, Jun. 3, 1992, Adobe Systems Incorporated, Mountain View, CA.

International Search Report and Written Opinion issued in PCT/US04/06013, mailed Aug. 4, 2008.

European Patent Office supplementary search report, European Patent Application No. 04750306.5-2217, issued Sep. 11, 2008.

Notification and International Preliminary Examination Report dated Apr. 4, 2011 for PCT/US04/06013.

"The Virtual Microscope", IEEE Transactions on Information Technology in Biomedicine, vol. 7, 2002, pp. 230-248.

EPO Communication dated Oct. 20, 2011 and Supplementary European Search Report dated Oct. 11, 2011 issued in EP 04715734.

SYSTEMS AND METHODS FOR ANALYZING DIGITAL SLIDE IMAGES USING ALGORITHMS CONSTRAINED BY PARAMETER DATA

RELATED APPLICATION

The present application is a continuation of U.S. patent application Ser. No. 13/494,715, filed 12 Jun. 2012 and issued 18 Jun. 2013 as U.S. Pat. No. 8,467,083, which is a continuation of U.S. patent application ser. No. 12/428,394, filed 22 April 2009, issued 12 Jun. 2012 as U.S. Pat. No. 8,199,358, which is a continuation of U.S. patent application Ser. No. 11/536,985, filed 29 Sep. 2006, issued 13 Oct. 2009 as U.S. Pat. No. 7,605,524, which is a continuation of U.S. patent application Ser. No. 10/787,330, filed 26 Feb. 2004, issued 3 Oct. 2006 as U.S. Pat. No. 7,116,440, which claims the benefit of U.S. provisional patent application Ser. No. 60/451,081, filed on 28 Feb. 2003, and U.S. provisional patent application Ser. No. 60/461,318, filed on 7 Apr. 2003, each of which is incorporated herein by reference in its entirety.

BACKGROUND

1. Field of the Invention

The present invention generally relates to digital microscopy and more specifically relates to the processing and analysis of digital slides.

2. Related Art

In the growing field virtual microscopy, the first challenges to be overcome were related to the digital imaging of microscope slides ("scanning"). Conventional image tiling is one approach that is widely prevalent in the virtual microscopy industry. The image tiling approach to scanning microscope slides employs a square or rectangular camera called a fixed area charge coupled device ("CCD"). The CCD camera takes hundreds or thousands of individual pictures ("image tiles") of adjacent areas on the microscope slide. Then the thousands of image tiles are each separately stored as a bitmap ("bmp") or a JPEG ("jpg") file on a computer. An index file is also required in order to identify the name of each image tile and its relative location in the overall image. As would be expected, the taking of thousands of individual pictures and storing each picture as an image tile along with creation of the index files takes a significantly long time. A conventional image tiling approach is described in U.S. Pat. No. 6,101,265. Although slow and cumbersome, conventional image tiling solutions did succeed in scanning microscope slides to create a digital slide.

Once the digital slide was present in a computer system, computer assisted image analysis became possible. Two significant drawbacks of processing image tiles are the computational expense of aligning tiles and correlating overlaps, and the presence of image artifacts along the seams between tiles. These problems each prevented practical application of automated image analysis to digital slide images. It has also proved difficult to maintain accurate focus for each of thousands of tiles in a digital slide produced in this way, reducing image quality.

A radical change in the virtual microscopy field has recently been developed by Aperio Technologies, Inc. that uses a new line scanning system to create a digital slide in minutes. It also creates the digital slide as a single TIFF file. This revolutionary line scanning system employs a line scan camera (i.e., called a linear-array detector) in conjunction with specialized optics, as described in U.S. Pat. No. 6,711,283 entitled "Fully Automatic Rapid Microscope Slide Scanner," which is currently being marketed under the name ScanScope®.

In addition to rapid data capture and creating a single file digital slide, the line scanning system also benefits from several advantages that ensure consistently superior imagery data. First, focus of the linear array can be adjusted from one scan line to the next, while image tiling systems are limited to a single focal plane for an entire image tile. Second, because the linear array sensor in a line scanning system is one-dimensional (i.e., a line), there are no optical aberrations along the scanning axis. In an image tiling system, the optical aberrations are circularly symmetric about the center of the image tile. Third, the linear array sensor has a complete (100%) fill factor, providing full pixel resolution (8 bits per color channel), unlike color CCD cameras that lose spatial resolution because color values from non-adjacent pixels must be interpolated (e.g., using a Bayer Mask).

The creation of a single file digital slide is an enormously significant improvement. Managing a single image file for a digital slide requires significantly less operating system overhead than the management of thousands of individual image tiles and the corresponding index file. Additionally, alignment of component images may be computed once, then re-used many times for automated processing.

Therefore, introduction of the superior line scanning system for creating single file digital slides has created a need in the industry for efficient digital slide image analysis systems and methods that meet the unique needs imposed by the new technology.

SUMMARY

A system and method for processing and analyzing virtual microscopy digital images ("digital slides") is provided. The system comprises an algorithm server that maintains or has access to a plurality of image processing and analysis routines. The algorithm server additionally has access to a plurality of digital slides. The algorithm server executes a selected routine on an identified digital slide and provides the resulting data. The digital slide can be accessed locally or remotely across a network. Similarly, the image processing routines can be obtained from local storage or across a network, or both. Advantageously, certain common sub-routines may be stored locally for inclusion in other local or remotely obtained routines.

Support for multiple users to access the digital slide sever and execute image analysis routines is provided through a monitor process that allows multiple inbound connections and routes those connections to the appropriate module within the server for processing. Additionally, the monitor process may also restrict access to viewing or processing of digital slides by enforcing various security policies such as limitations on source network addresses, username and password authentication, and session timeouts. These and other variations in access to viewing and analyzing images provide a rich diversity in access levels that allow sharing of digital slides and demonstrations of image processing algorithms.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide a framework for processing and analysis of digital slide images. The system comprises an algorithm server that executes image processing instructions (referred to herein as "algorithms," "routines," and "sub-routines") on digital slide images or sub-regions of a digital slide image. For example, one method disclosed herein allows a user to identify a digital slide image (or a sub-region thereof) and an algorithm to be used in the processing and analysis of the image. The server then executes the algorithm to process and analyze the image. The results may be provide to the screen, to a file, to a database, or otherwise presented, captured and/or recorded. Certain parameters may also be provided by the user or obtained from a data file corresponding to the particular algorithm to constrain the processing and analysis called for in the algorithm.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
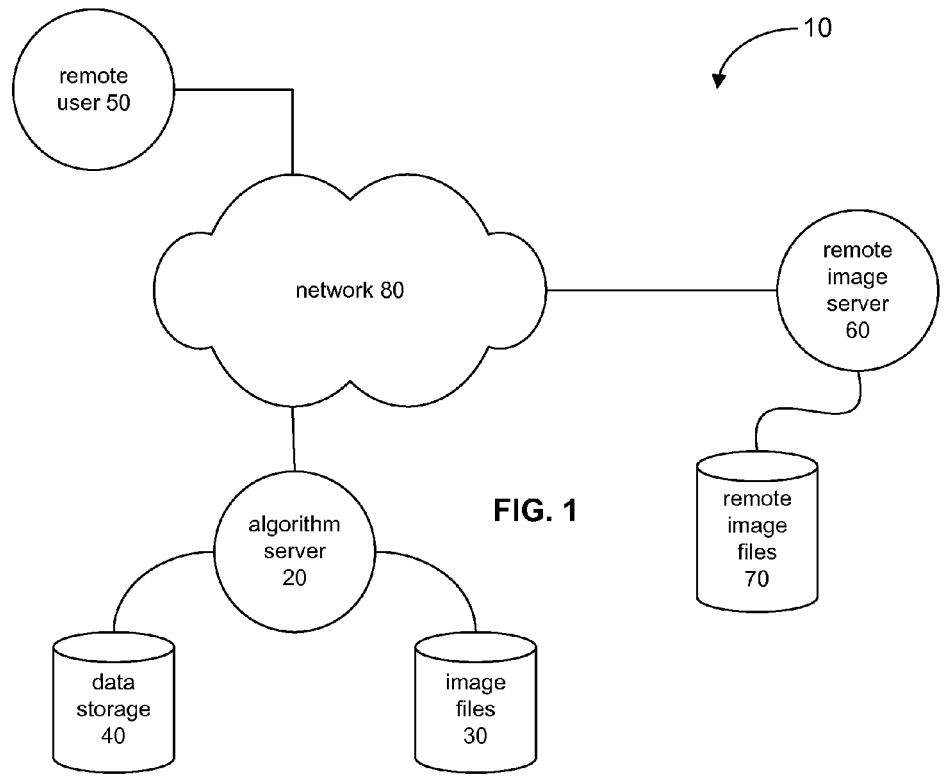
FIG. 1 is a network diagram illustrating an example system for image processing and analysis according to an embodiment of the present invention.

FIG. 1 is a network diagram illustrating an example system 10 for image processing and analysis according to an embodiment of the present invention. In the illustrated embodiment, the system 10 comprises an algorithm server 20 that is communicatively linked with one or more remote users 50 and one or more remote image servers 60 via a network 80. The algorithm server is configured with a data storage area 40 and a plurality of local image files 30. The data storage area preferably comprises information related to the processing of digital image files, for example it may store certain analysis routines, parameters, and procedural lists of analysis routines and associated parameters ("macros"), among other types of data. The local image files 30 and remote image files 70 are preferably digital slides of the type created by the ScanScope® Microscope Slide Scanner developed by Aperio Technologies, Inc.

The remote image server 60 is preferably configured with a data storage area having a plurality of image files 70 that are considered remote from the algorithm server. In one embodiment, the algorithm server 20 may access the remote digital slide images 70 via the network 80. The remote user 50 may comprise a web browser, an imagescope viewer, a scanscope console, an algorithm framework, or some other client application or front end that facilitates a user's interaction with the algorithm server 20. The network 80 can be a local area network ("LAN"), a wide area network ("WAN"), a private network, public network, or a combination of networks such as the Internet.

Figure 2:
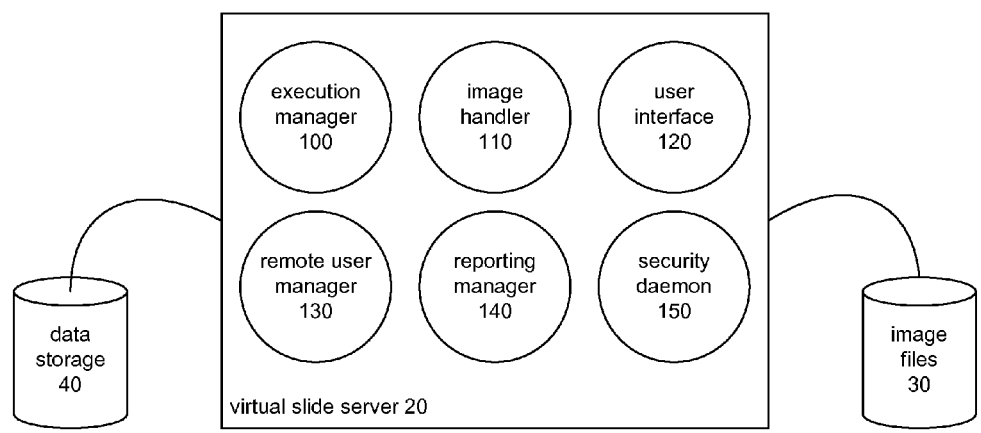
FIG. 2 is a block diagram illustrating an example algorithm server according to an embodiment of the present invention.

FIG. 2 is a block diagram illustrating an example algorithm server 20 according to an embodiment of the present invention. In the illustrated embodiment, the algorithm server 20 comprises an execution manager 100, an image handler 110, a user interface 120, a remote user manager 130, a reporting manager 140, and a security daemon 150. The algorithm server is also configured with a data storage area 40 and a plurality of local image files 30 and a plurality of remote image files 70. Preferably, the local and remote image files are digital slides.

The execution manager 100 handles the process of executing an algorithm to conduct image analysis or other types of analysis on a digital slide. The execution manager 100 can be in communication with the other components of the algorithm server in order to process the image analysis requests from one or more local or remote users. For example, the execution manager 100 is configured to receive an instruction from a user to run a particular algorithm on a certain digital slide. The execution manager 100 is also configured to collect parameter data from the user that will be used by the algorithm during execution. The parameters may define a sub-region of the digital slide to be processed by the algorithm and/or may define certain threshold values or provide other data elements to constrain the algorithm during execution.

The execution manager 100 is communicatively coupled with the image handler 110 in order to obtain the digital slide (or portion thereof) for analysis and processing pursuant to the particular algorithm. Because digital slides are such large files (10-15 GB uncompressed), a specialized image handler 110 is employed to efficiently and quickly obtain image data for processing. Advantageously, the image handler 110 can obtain image data from digital slides that are stored either locally (image files 30) or remotely (image files 70). Additionally, the image handler 110 provides the digital slide image in a standard format by decompressing the stored digital slide image from various compression formats including JPEG, JPEG2000, and LZW formats.

Another function of the image handler 110 is to provide the image data from a digital slide at the proper level of magnification. For example, an image may be stored in at a native resolution of 40X but a resolution of 20X is called for by the algorithm. The image handler 110 can downsample the native resolution and deliver the image data at a resolution of 20X to the execution manager 100. Such ability provides a significant advantage in speed for algorithms that initially process an image at a low resolution where objects of interest are detected and subsequently process the image at a high resolution where the analysis of those sub-regions containing the identified objects of interest is carried out. For example, the amount of image data to be processed in a 40X image is four times the amount of image data to be processed in a 20X image, so an algorithm which processes a 40X image at a resolution of 20X can run four times faster.

The user interface 120 preferably provides the user with a simple and easy to use format for interacting with the execution manager 100 in order to identify the algorithm to execute and the digital slide to be analyzed. Additionally the user interface 120 can efficiently collect parameter data from a user prior to execution of an algorithm. The user interface 120 also allows a user to create a macro comprising a plurality of algorithms and associated parameters.

The remote user manager 130 preferably manages the connection and communication with a user that is accessing the algorithm server 20 through a network connection. The remote user manager 130 is also configured to receive requests from network based users and programs, and to process those requests in real time or as a scheduled batch.

The reporting manager 140 is preferably configured to receive output and processing results from the execution manager 100 as an algorithm executes and generates data or other output. The reporting manager may also access output files after an algorithm is finished processing and then restructure the data in the output file into a standard report format. Additional reporting capabilities may also be provided by the reporting manager 140, as will be understood by those having skill in the art.

The security daemon 150 advantageously handles image processing requests that originate from a network based user or program. The security daemon 150 receives all incoming network requests and examines those requests to determine if they are seeking to process an image with an algorithm. If so, the security daemon 150 is configured to validate the request and if the request is valid, then the security daemon 150 passes the request off to the execution manager 150 for processing.

In one embodiment, the data storage area 40 may contain a plurality of algorithms that can be executed in order to analyze digital slide images. Additionally, the data storage area 40 may also contain a plurality of sub-routines that are commonly performed or often included in image processing algorithms. Advantageously, these common sub-routines can be dynamically linked into an algorithm at runtime so that the algorithm development effort is simplified. Additionally, the data storage area 40 may also comprise a plurality of macros, where a macro comprises a linear or parallel sequence of processing images with algorithms to achieve a desired analysis. A macro may also comprise parameter data to define subregions of images where appropriate and provide variables to constrain the image processing.

Figure 3:
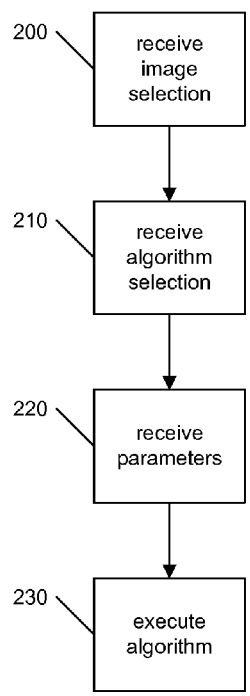
FIG. 3 is a flow diagram illustrating an example process for executing an image processing algorithm according to an embodiment of the present invention.

FIG. 3 is a flow diagram illustrating an example process for executing an image processing algorithm according to an embodiment of the present invention. Initially, in step 200, the execution manager receives an image selection. The image selection can be for a particular digital slide, or an identified sub-region thereof. Next, in step 210, the execution manager receives a selection for the algorithm to be run. There may in fact be more than one algorithm, or the execution manager may receive the selection of a macro that comprises several algorithms. In step 220, the execution manager receives parameter data necessary to run the algorithm(s). Advantageously, the execution manager may query the algorithm or check a corresponding data file to determine what parameter data will be required to run the algorithm(s). Finally, in step 230, after the image has been selected and the algorithm selected and the parameter data provided, the execution manager runs the algorithm and preferably provides any output to an output file, the screen, a database, or other display or storage facility.

Figure 4:
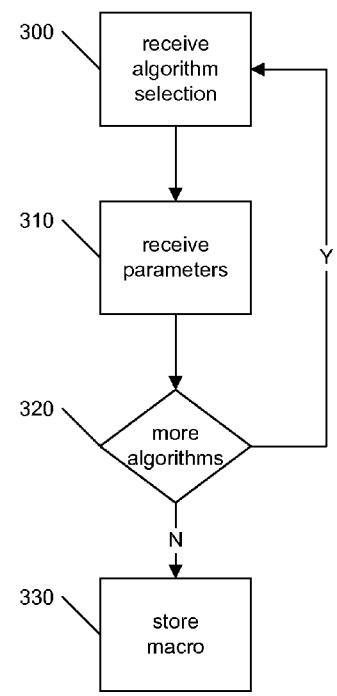
FIG. 4 is a flow diagram illustrating an example process for creating an image processing macro according to an embodiment of the present invention.

FIG. 4 is a flow diagram illustrating an example process for creating an image processing macro according to an embodiment of the present invention. Initially, in step 300, the execution manager receives a selection for the first algorithm to be run as part of the macro. Next, in step 310, the execution manager receives the parameter data that corresponds to the selected algorithm. In some cases, all of the parameter may not be provided when the macro is created. Advantageously, the execution manager can collect a partial set of parameter data and then when the macro is run, the execution manager can prompt the user for the needed additional parameter data. For example, the user or program requesting the macro be run will also have to identify the digital slide to be processed, and optionally the subregion of the image on which the algorithm will operate.

Once the algorithm selection and the parameter data have been collected, the user is prompted to determine in step 320 if there are more algorithms to be included in the macro. If so, then the process loops back to collect the algorithm selection and parameter data as described immediately above. If the macro definition is complete, then in step 330 the macro is stored in persistent data storage for later retrieval and execution.

Figure 5:
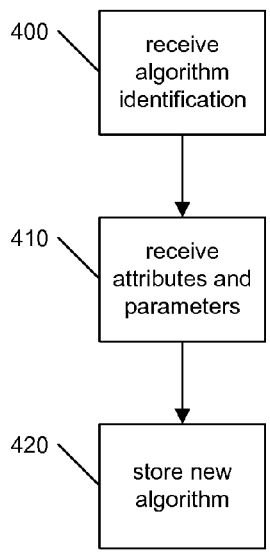
FIG. 5 is a flow diagram illustrating an example process for importing a remote image processing algorithm according to an embodiment of the present invention.

FIG. 5 is a flow diagram illustrating an example process for importing a remote image processing algorithm according to an embodiment of the present invention. In the first step 400, the execution manager receives the identification of an algorithm that is located on another server or computer that is remotely located and accessible via the network. Once the remote algorithm has been identified, in step 410 the execution manager receives any algorithm attributes and an identification of the parameters required by the algorithm during execution. These attributes and parameter requirements are preferably stored in a fashion that they correspond to the algorithm so that at a later time the execution manager may retrieve this information prior to execution of the algorithm, which will facilitate the collection of the parameter data prior to execution. Finally, in step 420, the new algorithm is stored along with its associated parameters and attributes.

Figure 6:
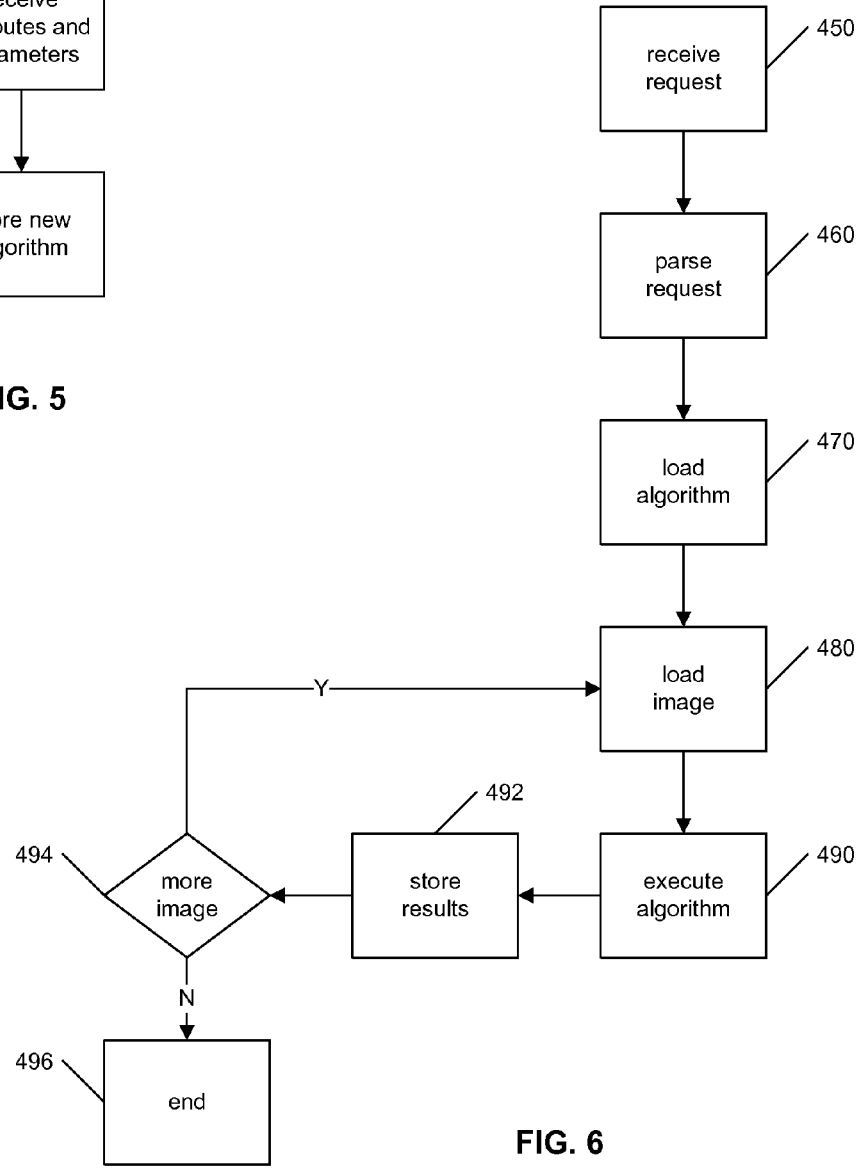
FIG. 6 is a flow diagram illustrating an example process for remotely executing an image processing algorithm according to an embodiment of the present invention.

FIG. 6 is a flow diagram illustrating an example process for remotely executing an image processing algorithm according to an embodiment of the present invention. Initially, in step 450, the execution manager receives a request from a remote user or program. Advantageously, the remote user may be an automated program that is developed to automate certain types of image processing on digital slides. Upon receipt of the request, in step 460, the execution manager parses the request to obtain information such as the particular algorithm to run, the identification of the digital slide (and optionally the sub-region thereof), as well as the parameter data.

Next, in step 470, the execution manager loads the algorithm and then also loads the image in step 480. At this point, the execution manager runs the algorithm to process the identified digital slide image, using the parameter data received in the request as necessary and in accordance with the particular algorithm. Any output generated by the running of the algorithm can advantageously be sent to a local output file or database, or it can be collected and the distributed remotely or locally or stored, as shown in step 492.

Digital slide images are very large, and it may be impractical to load an entire image in step 480. In such cases steps 480 and 490 can be repeated iteratively for multiple consecutive sub-regions of the digital slide image. Depending on the nature of the algorithm, it may be necessary or desirable to overlap the processed sub-regions, and then adjust the algorithm results. Accordingly, in step 494, the execution manager determines if there is more image data or additional image sub-regions to process. If so, the process loops back to step 480 where the next sub-region of the image is loaded. If there are no more sub-regions to process, then the execution manager can end the image processing, as illustrated in step 496.

Furthermore, some algorithms may benefit from multiple "passes" or recursive analysis/processing on an image. For example, a first pass (execution of the image processing instructions) can be made at low resolution (20X) to identify sub-regions of the image which require further analysis. Then a second pass (execution of the image processing instructions) can be made at high resolution (40X) to process and analyze just those sub-regions identified in the first pass. Advantageously, the algorithm results would reflect both passes (the sub-region identification and the output of the processing of the sub-regions).

Figure 7:
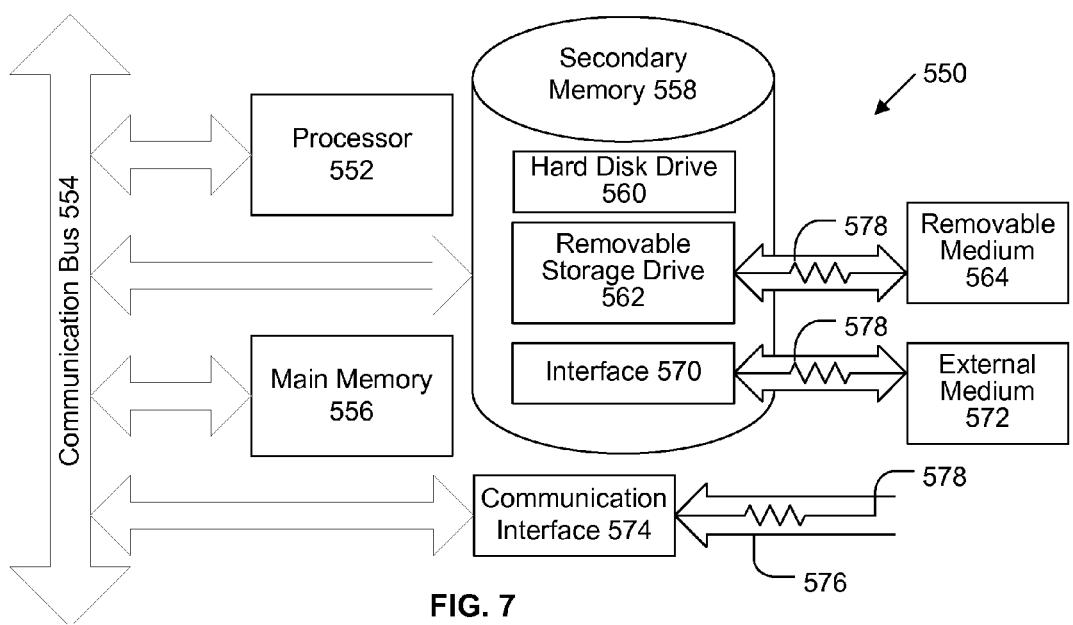
FIG. 7 is a block diagram illustrating an exemplary computer system as may be used in connection with various embodiments described herein.

FIG. 7 is a block diagram illustrating an exemplary computer system 550 that may be used in connection with the various embodiments described herein. For example, the computer system 550 may be used in conjunction with an algorithm server, a remote image server or a remote user station. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer-implemented method for processing the content of a digital image of a microscope sample, the method comprising, by at least one hardware processor:
    receiving an identification of one or more algorithms over at least one network;
    receiving an identification of one or more digital slide images over the at least one network;
    receiving one or more parameter data for the identified one or more algorithms;
    retrieving the one or more digital slide images;
    executing the identified one or more algorithms to analyze the identified one or more digital slide images; and
    constraining the execution of the identified one or more algorithms based on the received parameter data.

2. The method of claim 1, wherein the one or more parameter data comprises a definition of a sub-region of at least one of the one or more digital slide images, and wherein constraining the execution of the identified one or more algorithms based on the parameter data comprises constraining execution of the identified one or more algorithms to the defined sub-region of the at least one digital slide image.

3. The method of claim 1, wherein the identification of one or more algorithms comprises an identification of a macro, and wherein the macro comprises an identification of two or more algorithms and the one or more parameter data.

4. The method of claim 1, wherein executing the identified one or more algorithms to analyze the identified one or more digital slide images comprises:
    down-sampling the one or more digital slide images from a native resolution to a lower resolution;
    executing at least one of the one or more algorithms to analyze the one or more digital slide images at the lower resolution; and
    executing at least one of the one or more algorithms to analyze the one or more digital slide images at the native resolution.

5. The method of claim 4, wherein executing at least one of the one more algorithms to analyze the one or more digital slide images at the lower resolution comprises identifying sub-regions of the one or more digital slide images for further analysis, and wherein executing at least one of the one or more algorithms to analyze the one or more digital slide images at the native resolution comprises analyzing only the identified sub-regions.

6. The method of claim 1, wherein the identification of one or more algorithms comprises an identification of a macro, wherein the macro comprises an identification of two or more algorithms.

7. The method of claim 1, wherein retrieving the one or more digital slide images comprises receiving the one or more digital slide images from a remote image server over the at least one network.

8. The method of claim 1, further comprising retrieving the one or more identified algorithms from a remote computer over the at least one network.

9. The method of claim 1, wherein the identification of one or more algorithms and the identification of one or more digital image slides is received from an automated program.

10. A system for processing the content of a digital image of a microscope sample, the system comprising:
    at least one hardware processor; and
    at least one executable software module that, when executed by the at least one hardware processor,
        receives an identification of one or more algorithms over at least one network,
        receives an identification of one or more digital slide images over the at least one network,
        receives one or more parameter data for the identified one or more algorithms,
        retrieves the one or more digital slide images,
        executes the identified one or more algorithms to analyze the identified one or more digital slide images, and
        constrains the execution of the identified one or more algorithms based on the parameter data.

11. The system of claim 10, wherein the one or more parameter data comprises a definition of a sub-region of one of the one or more digital slide images, and wherein constraining the execution of the identified one or more algorithms based on the parameter data comprises constraining execution of the identified one or more algorithms to the defined sub-region of the digital slide image.

12. The system of claim 10, wherein the identification of one or more algorithms comprises an identification of a macro, and wherein the macro comprises an identification of two or more algorithms and the one or more parameter data.

13. The system of claim 10, wherein executing the identified one or more algorithms to analyze the identified one or more digital slide images comprises:
    down-sampling the one or more digital slide images from a native resolution to a lower resolution;
    executing at least one of the one or more algorithms to analyze the one or more digital slide images at the lower resolution; and
    executing at least one of the one or more algorithms to analyze the one or more digital slide images at the native resolution.

14. The system of claim 13, wherein executing at least one of the one more algorithms to analyze the one or more digital slide images at the lower resolution comprises identifying sub-regions of the one or more digital slide images for further analysis, and wherein executing at least one of the one or more algorithms to analyze the one or more digital slide images at the native resolution comprises analyzing only the identified sub-regions.

15. The system of claim 10, wherein the identification of one or more algorithms comprises an identification of a macro, wherein the macro comprises an identification of two or more algorithms.

16. The system of claim 10, wherein retrieving the one or more digital slide images comprises receiving the one or more digital images from a remote image server over the at least one network.

17. The system of claim 10, wherein the at least one executable software module further retrieves the one or more identified algorithms from a remote computer over the at least one network.

18. The system of claim 10, wherein the identification of one or more algorithms and the identification of one or more digital image slides is received from an automated program.

* * * * *